(12) United States Patent
Meinke et al.

(10) Patent No.: US 12,003,152 B2
(45) Date of Patent: *Jun. 4, 2024

(54) DUAL ROTOR ELECTRICAL MACHINES

(71) Applicant: Advanced Magnet Lab, Inc., Melbourne, FL (US)

(72) Inventors: Rainer Meinke, Melbourne, FL (US); Shashikant Manikonda, Melbourne, FL (US)

(73) Assignee: Advanced Magnet Lab, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,429

(22) Filed: Feb. 6, 2023

(65) Prior Publication Data

US 2023/0188018 A1 Jun. 15, 2023

Related U.S. Application Data

(63) Continuation of application No. 17/146,381, filed on Jan. 11, 2021, now Pat. No. 11,575,301, which is a (Continued)

(51) Int. Cl.
| | |
|---|---|
| *H02K 21/12* | (2006.01) |
| *B60K 7/00* | (2006.01) |
| *H01F 1/057* | (2006.01) |
| *H01F 41/02* | (2006.01) |
| *H02K 1/27* | (2022.01) |

(Continued)

(52) U.S. Cl.
CPC ............ *H02K 16/025* (2013.01); *B60K 7/00* (2013.01); *H01F 1/0576* (2013.01); (Continued)

(58) Field of Classification Search
CPC ........ H02K 16/025; H02K 1/27; H02K 1/278; H02K 3/28; H02K 3/42; H02K 15/03; (Continued)

(56) References Cited

U.S. PATENT DOCUMENTS

| 2009/0045690 A1* | 2/2009 | Kerlin .................... H02K 31/00 310/178 |
| 2009/0206974 A1* | 8/2009 | Meinke ..................... H01F 5/00 336/224 |

(Continued)

*Primary Examiner* — Mohamad A Musleh
(74) *Attorney, Agent, or Firm* — Lowndes; Stephen C. Thomas; Robert R. Fredeking

(57) ABSTRACT

A dual-rotor machine comprising a dual rotor support structure rotatably connected to a frame. A stationary stator is disposed between the rotors and is fixed to the frame. An inner rotor and outer rotor, each comprising a permanent magnet Halbach array, are coaxially disposed with the stator and are rotable about the stator. In this configuration, the inner rotor channels its magnetic flux to its outside, while the outer rotor channels its magnetic flux to its inside. The magnetic flux density at the stator for the dual-rotor machine can be as high as 2 Tesla or higher for high-grade neodymium-iron-boron permanent magnet material, and the stored magnetic energy for conversion to mechanical or electrical energy available to the stator may be at least 0.5 kJ/m. The rotor Halbach arrays may comprise monolithic permanent magnets with continuously variable magnetic field direction.

9 Claims, 12 Drawing Sheets

Related U.S. Application Data continuation of application No. 16/089,622, filed as application No. PCT/US2017/025214 on Mar. 30, 2017, now Pat. No. 10,892,672.

(60) Provisional application No. 62/478,941, filed on Mar. 30, 2017, provisional application No. 62/315,622, filed on Mar. 30, 2016, provisional application No. 62/314,991, filed on Mar. 30, 2016.

(51) Int. Cl.

| | | |
|---|---|---|
| *H02K 1/278* | (2022.01) | |
| *H02K 1/2783* | (2022.01) | |
| *H02K 1/2786* | (2022.01) | |
| *H02K 1/2792* | (2022.01) | |
| *H02K 3/28* | (2006.01) | |
| *H02K 3/42* | (2006.01) | |
| *H02K 15/03* | (2006.01) | |
| *H02K 16/02* | (2006.01) | |
| *B22F 9/04* | (2006.01) | |

(52) U.S. Cl.
CPC ..... *H01F 41/0266* (2013.01); *H01F 41/0273* (2013.01); *H02K 1/27* (2013.01); *H02K 1/278* (2013.01); *H02K 1/2783* (2022.01); *H02K 1/2792* (2022.01); *H02K 3/28* (2013.01); *H02K 3/42* (2013.01); *H02K 15/03* (2013.01); *H02K 16/02* (2013.01); *H02K 21/12* (2013.01); *B22F 9/04* (2013.01); *H02K 1/2786* (2013.01); *H02K 2201/03* (2013.01)

(58) Field of Classification Search
CPC ...... H02K 16/02; H02K 21/12; H02K 1/2786; H02K 2201/00; B60K 7/00; H01F 1/0576; H01F 41/0266; H01F 41/0273; B22F 9/04

See application file for complete search history.

(56) References Cited

U.S. PATENT DOCUMENTS

| | | | | |
|---|---|---|---|---|
| 2014/0132376 A1* | 5/2014 | Jin | ......... | H01F 1/0573 |
| | | | | 75/346 |
| 2015/0171694 A1* | 6/2015 | Walsh | ..... | H02K 29/03 |
| | | | | 310/156.43 |
| 2015/0236575 A1* | 8/2015 | Walsh | ..... | H02K 21/12 |
| | | | | 310/211 |
| 2017/0126087 A1* | 5/2017 | Soderberg | ........ | H02K 5/02 |
| 2020/0313526 A1* | 10/2020 | Gabrys | ..... | H02K 15/03 |

* cited by examiner

DUAL ROTOR ELECTRICAL MACHINES

RELATED APPLICATIONS

This non-provisional patent application filed in the United States Patent and Trademark Office (USPTO) is a continuation of U.S. patent application Ser. No. 17/146,381, filed in the USPTO on Jan. 11, 2021, entitled "DUAL-ROTOR ELECTRICAL MACHINES", which published as U.S. Patent Publication No. US 2021-0273540 A1 on Sep. 9, 2021 and which issued from the USPTO as U.S. Pat. No. 11,575,301 on Feb. 7, 2023, which is hereby incorporated herein by reference in its entirety; U.S. Ser. No. 17/146,381 is a continuation of U.S. patent application Ser. No. 16/098,622, filed in the USPTO on Sep. 28, 2018 entitled "DUAL-ROTOR SYNCHRONOUS ELECTRICAL MACHINES", which published from the USPTO as U.S. Patent Publication No. US 2019-0109526 A1 on Apr. 11, 2010, and which issued from the USPTO as U.S. Pat. No. 10,892,672 on Jan. 12, 2021, which is hereby incorporated herein by reference in its entirety and which is a national stage of international application PCT/US17/25214, filed in the USPTO on Mar. 30, 2017, entitled "DUAL-ROTOR SYNCHRONOUS ELECTRICAL MACHINES" which published as WO2017/173188 on Oct. 5, 2017, which is hereby incorporated herein by reference in its entirety; PCT/US17/25214 is a non-provisional of U.S. provisional patent application No. 62/315,622 filed in the United States Patent and Trademark Office (USPTO) on Mar. 30, 2016, entitled "METHOD OF MANUFACTURING PERMANENT MAGNETS", which is hereby incorporated herein by reference in its entirety; PCT/US17/25214 also is a non-provisional of U.S. provisional patent application No. 62/314,991, filed in the USPTO on Mar. 30, 2016 entitled "DUAL-ROTOR SYNCHRONOUS ELECTRICAL MACHINES", which is also hereby incorporated herein by reference in its entirety; and PCT/US17/25214 is also a non-provisional of U.S. provisional patent application 62/478,941, titled "Single-step Manufacturing of Flux-Directed Permanent Magnet Assemblies", filed in the United States Patent and Trademark Office on Mar. 30, 2017, which is also hereby incorporated by reference herein in its entirety. All the foregoing identified U.S. Patent Publications, granted U.S. Patents, and U.S. patent applications are incorporated by reference herein in their entirety.

FIELD OF INVENTION

The present disclosure generally relates to high power density electrical machines; more specifically, the present disclosure relates to dual-rotor synchronous machines.

BACKGROUND

Power and torque density, i.e. power and torque per kg, are important performance parameters for many applications of electrical machines—motors and generators. One example of applications for which power density is of utmost importance is electrical propulsion for future aircraft. Accordingly, various possibilities for improving power and torque densities of synchronous machines have been investigated. The general approach to maximize power and torque density is to maximize magnetic flux density at the stator, and to make all components of the machine as light as possible in order to maximize efficiency all potential losses must be minimized.

SUMMARY

In accordance with the inventions presented herein, embodiments related to dual-rotor synchronous machines are disclosed.

In an embodiment, a dual-rotor machine comprises a stationary frame 207 and a dual rotor support structure 208 rotatably connected to a frame, and attached to an inner and an outer rotor. The inner rotor 101 comprises a first Halbach array, which is mechanically connected to the dual rotor support structure 208. The outer rotor comprises a second Halbach array and is mechanically connected to dual rotor support structure 208. The dual-rotor machine further comprises a stationary stator 103 that is fixedly connected to the frame 207. The stator 103 is positioned between rotors 100 and 101: i.e., inside the outer rotor 100 and outside the inner rotor 101. The dual cylinder 208 with outer rotor 100 and inner rotor 101 are rotatable B about an axis of rotation A that runs along the longitudinal axis of the motor while the frame and stator remains stationary. The axis of rotation of the rotors 101 and 100 forms the longitudinal axis of the dual rotor motor assembly 001.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

In the figures, like callout numbers refer to like elements.

DETAILED DESCRIPTION OF THE PREFERRED EMBODIMENTS

A detailed description of the embodiments for a dual-rotor synchronous electrical machine will now be presented with reference to FIGS. 1 through 12. One of skill in the art will recognize that these embodiments are not intended to be limitations on the scope, and that modifications are possible without departing from the spirit thereof. In certain instances, well-known methods, procedures and components have not been described in detail.

Figure 1:
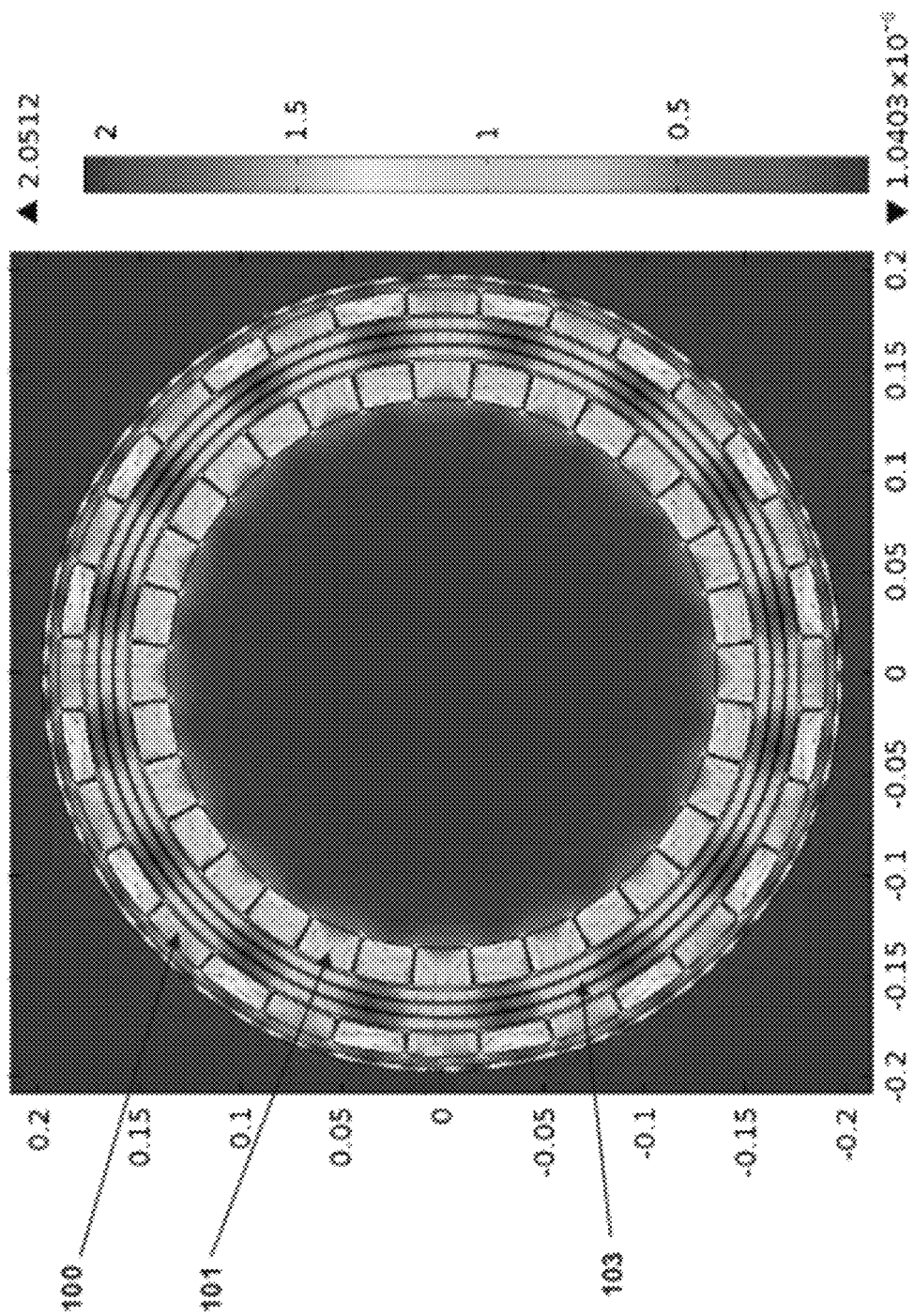
FIG. 1 is plot of magnetic flux density (T) in the inner and outer arrays and the resulting interior and exterior magnetic fields.
Figure 2:
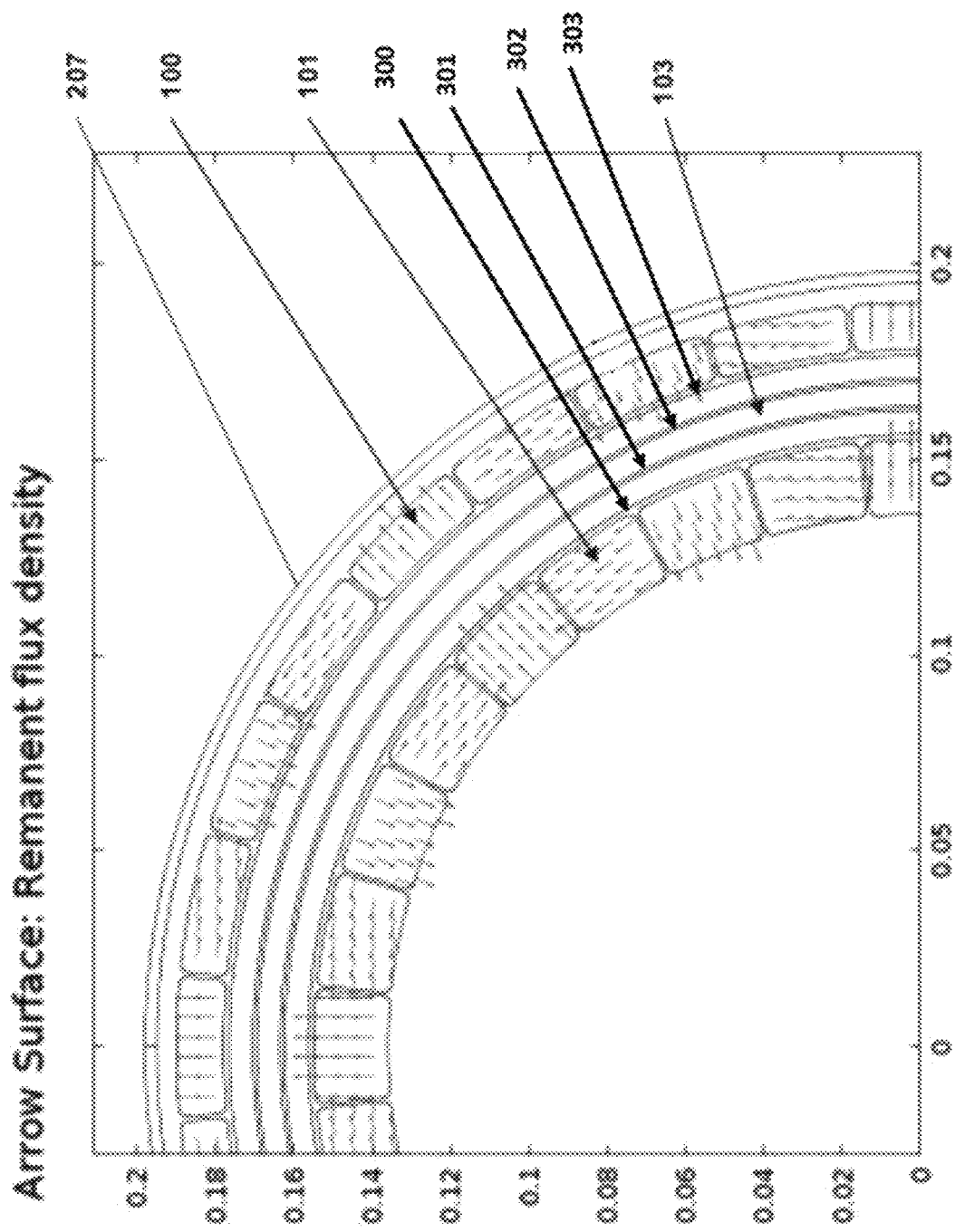
FIG. 2 is a two-dimensional magnetic field simulation of a dual-rotor machine according to an embodiment of the present invention.
Figure 3:
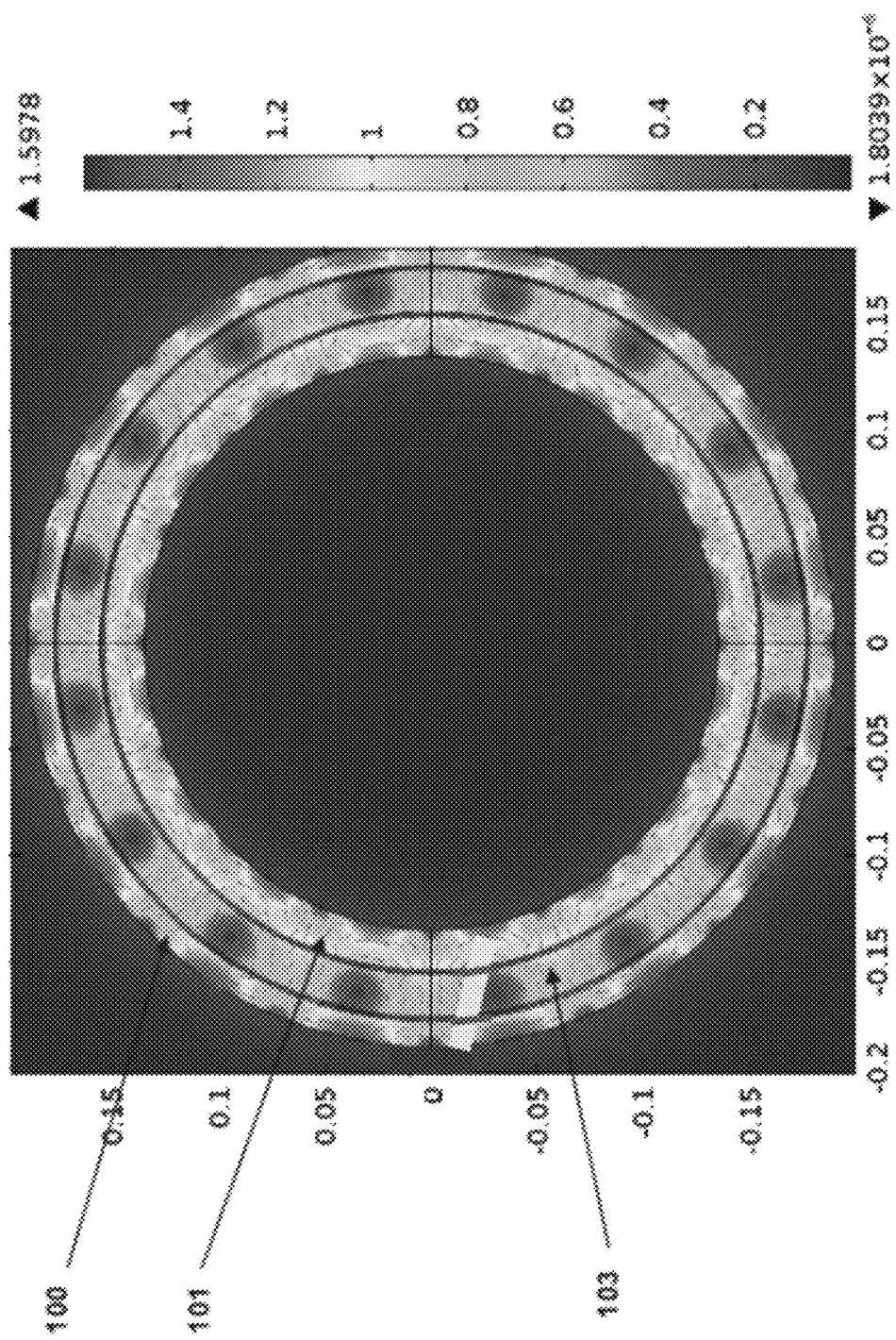
FIG. 3 is a two-dimensional magnetic field simulation of a dual-rotor machine according to an embodiment of the present invention.
Figure 4:
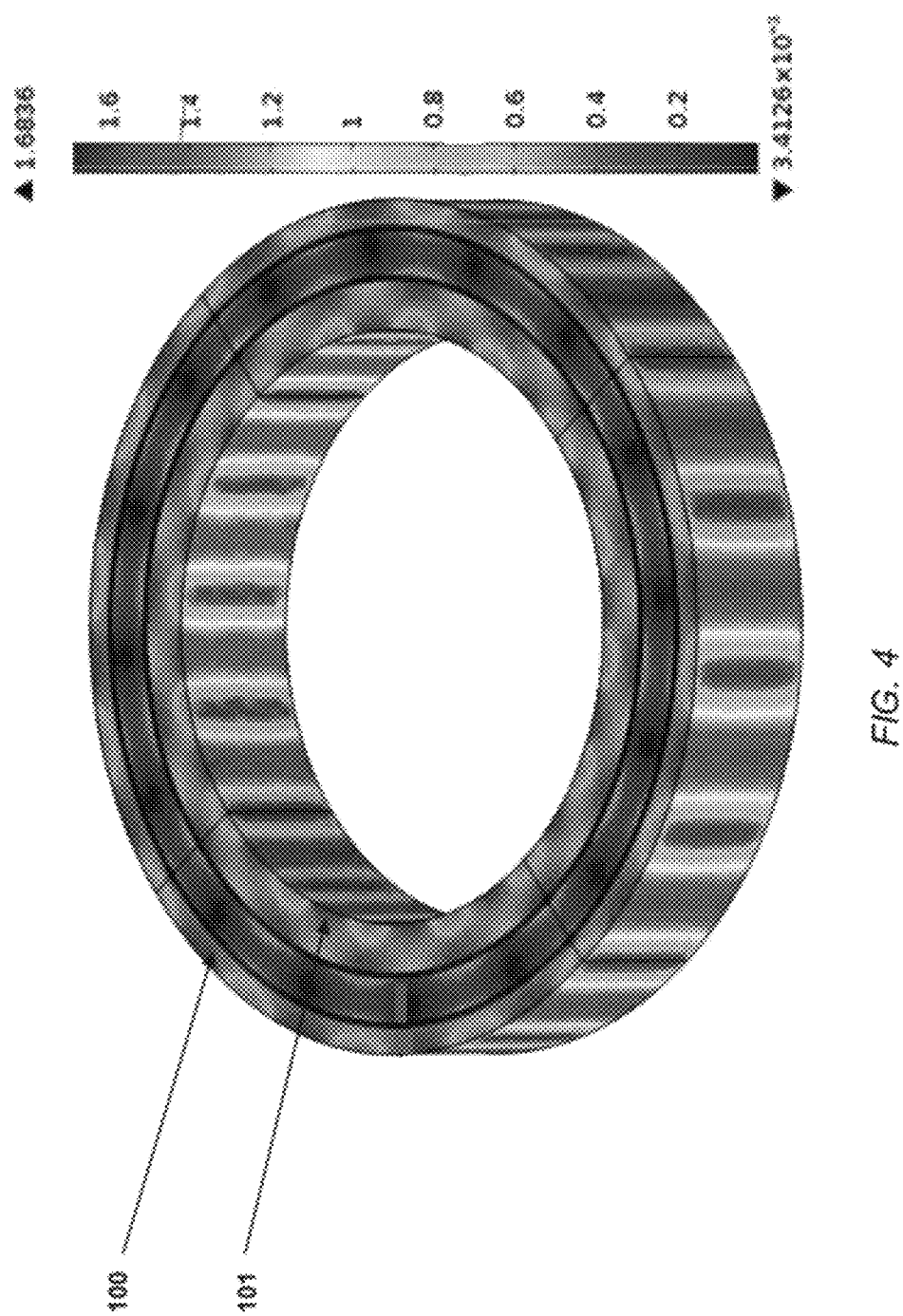
FIG. 4 is a perspective view of a simulation of magnetic field strength for a dual-rotor machine according to an embodiment of the present invention.
Figure 5:
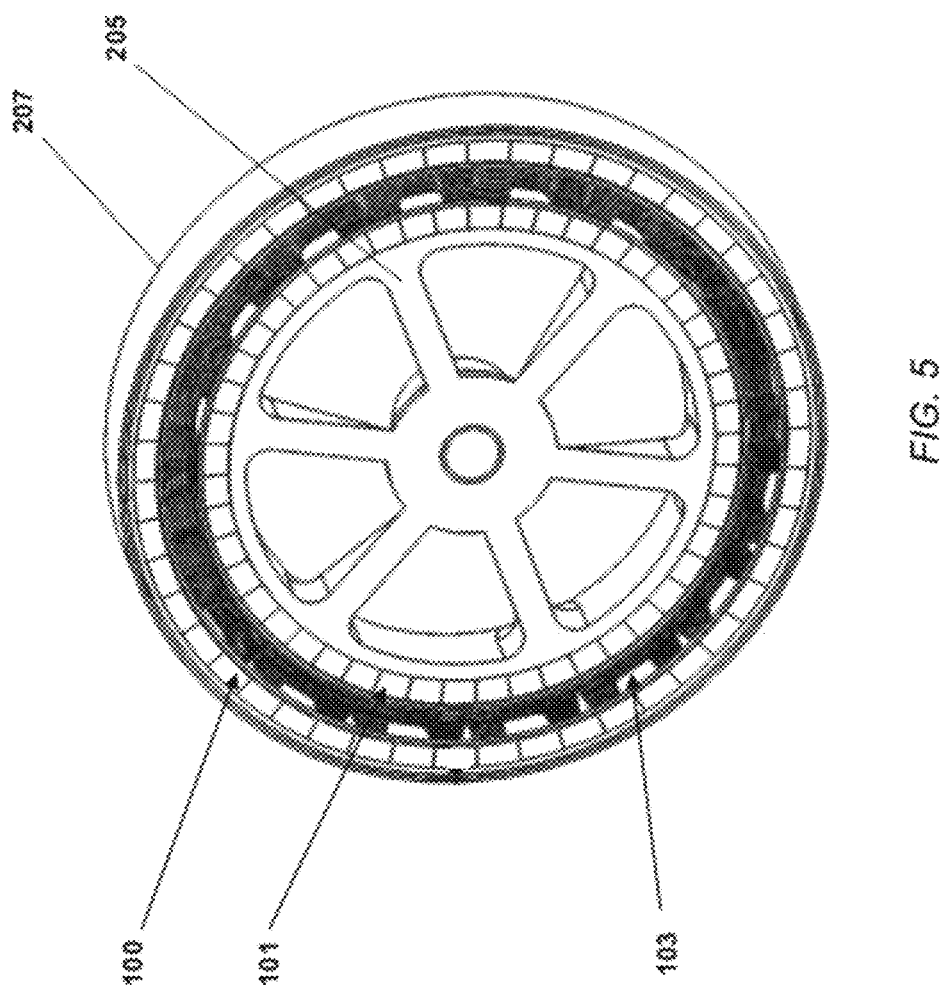
FIG. 5 is a perspective cross section view of a dual-rotor machine according to an embodiment of the present invention.
Figure 6:
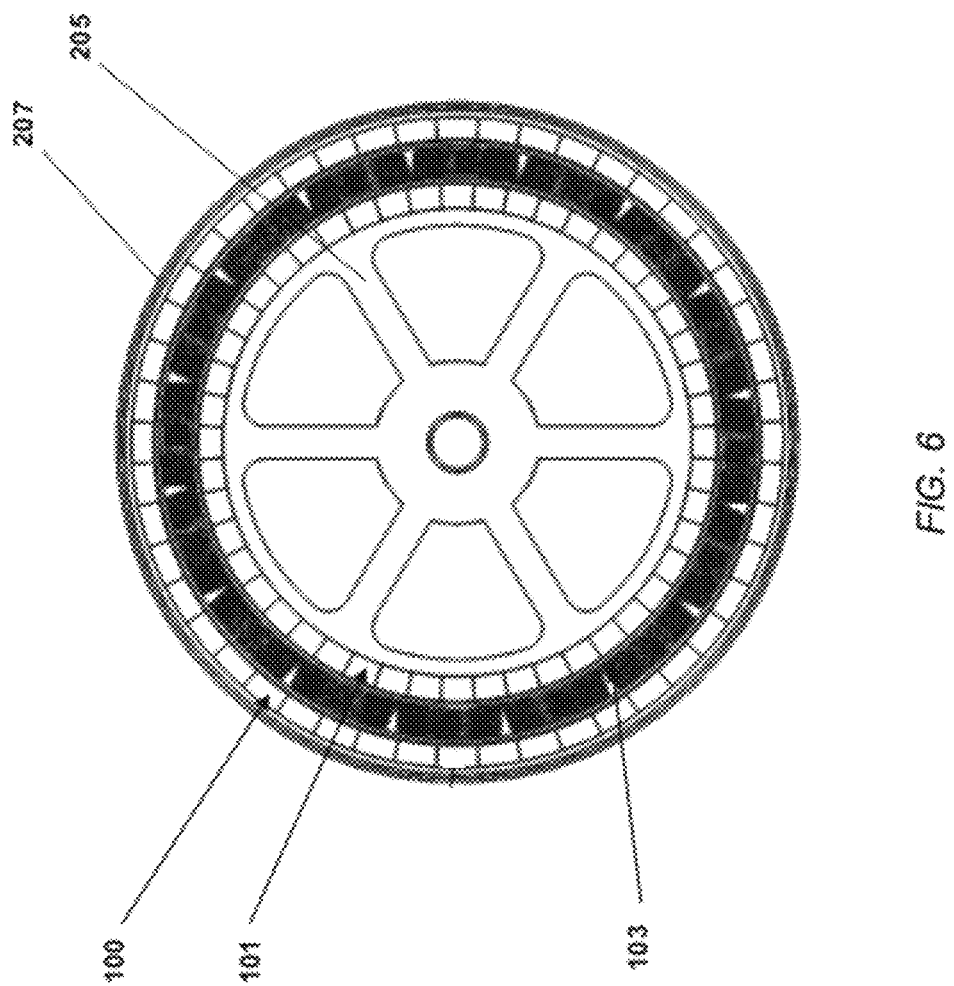
FIG. 6 is an end view of a dual-rotor machine (same as in FIG. 5 (right)) according to an embodiment of the present invention.
Figure 7:
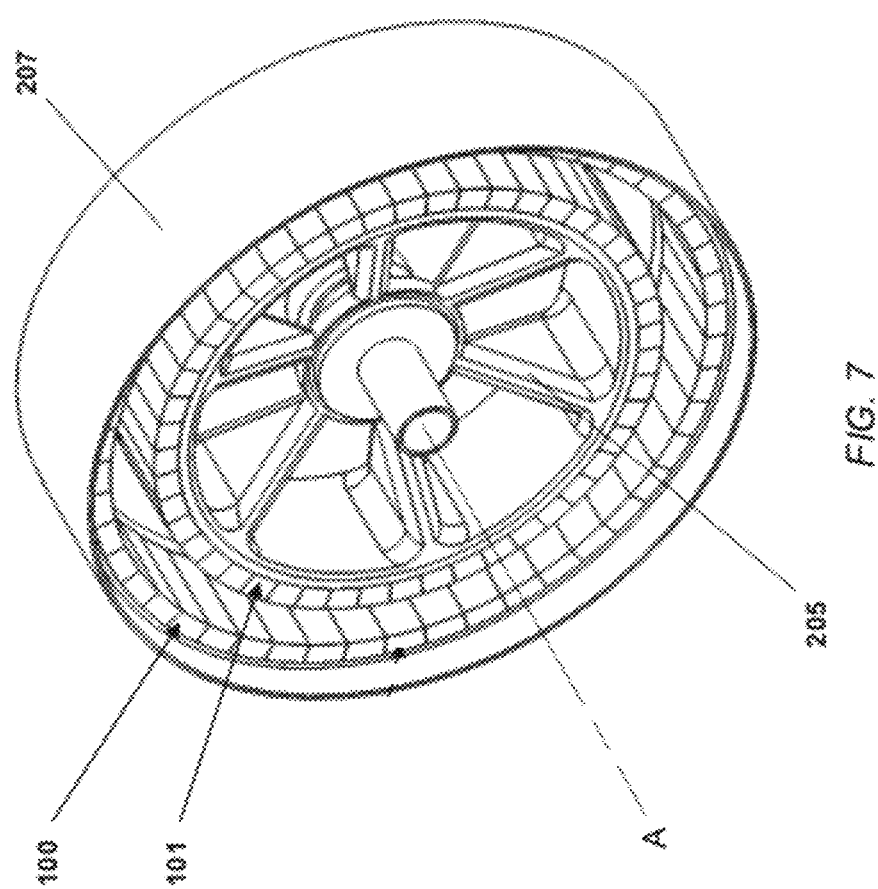
FIG. 7 is a perspective view of a dual-rotor machine according to an embodiment of the present invention.
Figure 8:
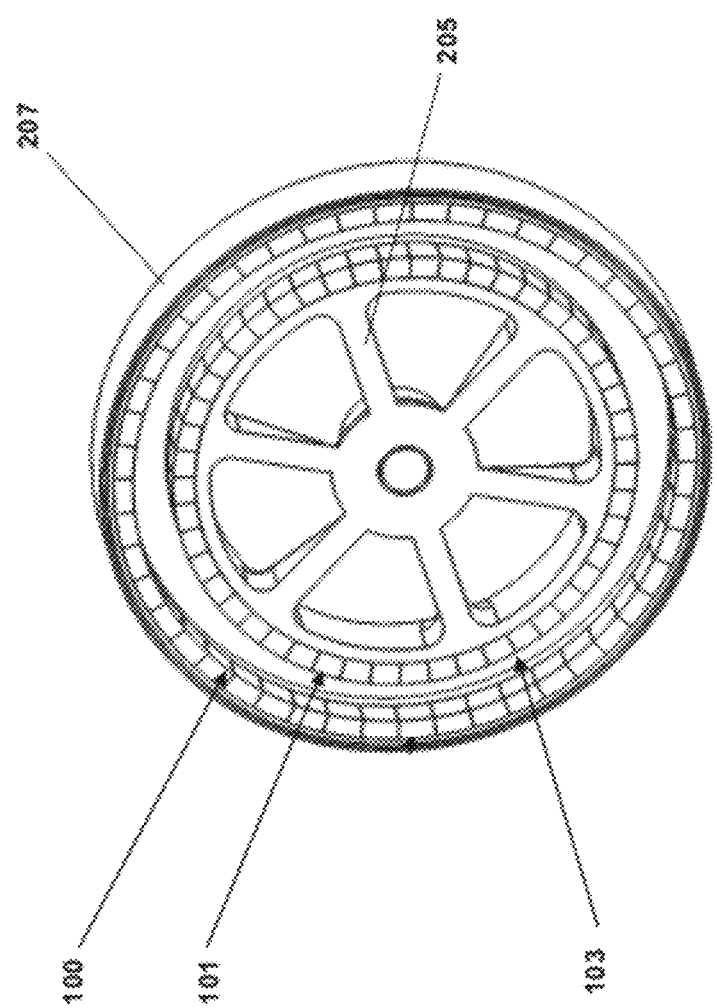
FIG. 8 is a perspective view of a dual-rotor machine according to an embodiment of the present invention.
Figure 9:
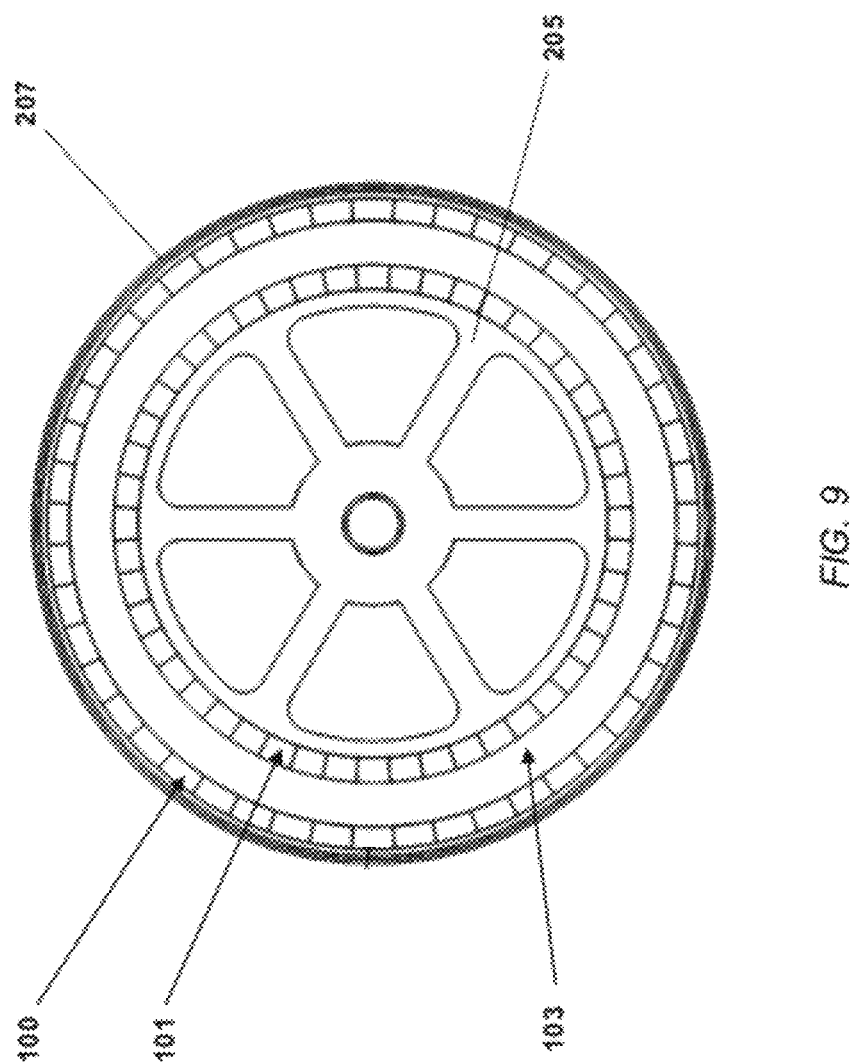
FIG. 9 is an end view of a dual-rotor machine according to an embodiment of the present invention.

As used herein, "Halbach array" includes within its meaning an arrangement of permanent magnets, or a monolithic permanent magnet with a continuously varying magnetic field that augments the magnetic field on one side of the array while cancelling the field to near zero on the other side. This is achieved by having a spatially rotating pattern of magnetization such as shown in FIG. 2.

Electrical machines in the form of a generator convert mechanical to electrical power and in the form of a motor convert electrical to mechanical power. In both cases power conversion is performed with the help of varying magnetic fields that are established between a rotor and a stator.

The field of the rotor can be generated with the help of a field winding that is excited by an electrical current or by permanent magnets. Embodiments of the present invention concern the latter case in which the rotor field is generated with the help of permanent magnets. To optimize power density of the electrical machine, the field in the air gap between rotors 100 and 101 and stator 103 should not only be the highest possible, but also be achieved with the lowest overall mass.

In a conventional, single rotor synchronous machine, the field in the air gap is determined by the permanent magnets and the back iron on the other side of the stator. A main effect of the back iron is bending the magnetic flux of the rotor into a radial direction, so that the flux is perpendicular to the stator winding. Since the Lorentz force is given by the cross product of magnetic flux and current direction, any deviation from perpendicularity reduces the acting force and, therefore, the efficiency of the machine. However, the required back iron has a negative effect on the efficiency since it is exposed to a changing magnetic flux. This changing magnetic flux, due to the unavoidable electrical conductivity of the back iron, leads to eddy current losses which reduce the efficiency of the machine. In fact, an increase in the flux density in the air gap unavoidably leads to an increase in eddy current losses in the back iron. Although these eddy current losses can be reduced by using laminated iron yokes and a material with the lowest electrical conductivity, the losses cannot be completely eliminated and they affect the machine efficiency, power and torque density. The present invention overcomes these disadvantages.

Referring now to FIGS. 1-4 for simulations of the magnetic fields of a dual-rotor machine of the invention, and to FIGS. 5-12 for views of an exemplary dual-rotor machine of the invention, embodiments of the dual-rotor machine of the present invention are seen to enhance the magnetic field in the air gap and eliminate any eddy current losses. To achieve this, two concentric magnetic assemblies comprising Halbach arrays (outer rotor 100 and inner rotor 101) are used to generate the flux density in the stator location and in the air gap surrounding the stator 103; i.e., between the inside of the stator 103 and the outside of the inner rotor 101, and between the outside of the stator 103 and the inside of outer rotor 100. A Halbach array channels the magnetic flux in such a way that it only appears on one side of the array where it is enhanced in comparison to a normal 2-pole magnet. The two concentric Halbach arrays (outer rotor 100 and inner rotor 101) of the present invention are arranged in such a way that the inner rotor 101 channels its magnetic flux to its outside, while the outer rotor 100 channels its magnetic flux to its inside. The two concentric Halbach arrays forming outer rotor 100 and inner rotor 101 are mechanically coupled together, for example through a common support structure such as structure 108, and are disposed such that the inner rotor 101 is inside and coaxial with outer rotor 100, and in the case in which both inner rotor 101 and outer rotor 100 are cylindrically shaped, each rotor is defined as having a longitudinal axis and each of the rotor axes are coaxially disposed forming a common axis between them. An enhanced magnetic field is generated in the space between the rotors in which the stator winding and air gaps between the stator and rotors are disposed. An advantage of the invention is that only an insignificant amount of magnetic flux is on the inside or outside of the dual rotor machine assembly 001. The inner rotor outside diameter 300 is less than stator inner diameter 301, and stator outside diameter 302 is less than outer rotor inside diameter 303.

Referring now specifically to FIGS. 1-4, a two-dimensional magnetic field simulation of an exemplary dual-rotor machine is depicted. In this simulation, an air gap was used to simulate a stator. An additional air gap was also used between the outer rotor 100 and the outer iron shell 207. The inner rotor 101 channels the magnetic flux to its outside, while the outer rotor 100 channels its magnetic flux to its inside. The magnetic flux density at the stator for this embodiment of the dual-rotor machine of the invention 001 is approximately 2 Tesla, and the stored energy density in the air gap of the stator 103 is approximately 0.5 kJ/m based on conventional neodymium-iron-boron permanent magnet material. This embodiment is exemplary, as the rotors of the invention may comprise any permanent magnet material, and alternate embodiments of the invention using different permanent magnet materials may exhibit resulting magnetic field strength in the rotor and air gap areas that are higher or lower than 2 Tesla.

Referring now to FIGS. 5-11, various views of an exemplary embodiment of a dual-rotor machine of the invention is shown. In this embodiment, an inner support structure 208 is encircled by a Halbach array, which comprises inner rotor 101. The Halbach array of inner rotor 101 is encircled by a stator 103 with an air gap between them. The stator 103 may be, for example, any stator winding, or a double-helix winding configuration, such as, for example, Direct-Double Helix™ wiring, which is the subject of U.S. Pat. No. 7,889,042, incorporated herein by reference in its entirety, or the helical-like wiring assemblies illustrated in U.S. Pat. Nos. 7,990,247 and 8,424,193, also both incorporated herein by reference in their entirety. Encircling the stator 103 is another Halbach array, which comprises outer rotor 100, with an air gap between stator 103 and outer rotor 100. If additional magnetic shielding is needed for the dual rotor machine 001, in an embodiment, the outer support structure 207 may be a thin iron cylinder or other thin iron structure that is mechanically fixed to the outer rotor 100. This optional iron shell 207 is not exposed to a time varying magnetic field and therefore does not generate any eddy current losses.

Still referring to FIGS. 4-11, In an embodiment, a dual-rotor machine comprises a stationary frame 207 and an dual rotor support structure 208 rotatably connected to the frame through, for example, bearings such as bearings 209, and internal support structure 205, allowing internal support structure 205, rotor support structure 208, and rotors 100 and 101 to rotate with respect to stator 103 and frame 107 about axis A, which may form a longitudinal axis of the dual axis machine. The support structure 208 comprises an inner rotor support structure and a concentric outer rotor support structure. The inner and outer support structures of support structure 208 are attached to and house an inner rotor 101 and an outer rotor 100, respectively. The inner rotor 101 comprises a first Halbach array. The dual-rotor machine further comprises a stationary stator 103 that is fixedly connected to the frame 207. The stator 103 is positioned between rotors 100 and 101: i.e., inside the outer rotor 100 and outside the inner rotor 101. The dual cylinder 208 with outer rotor 100 and inner rotor 101 are rotatable B about an axis of rotation A that runs along the longitudinal axis of the motor while the frame and stator remains stationary. The axis of rotation of the rotors 103 forms the longitudinal axis of the dual rotor motor assembly 001.

Figure 10:
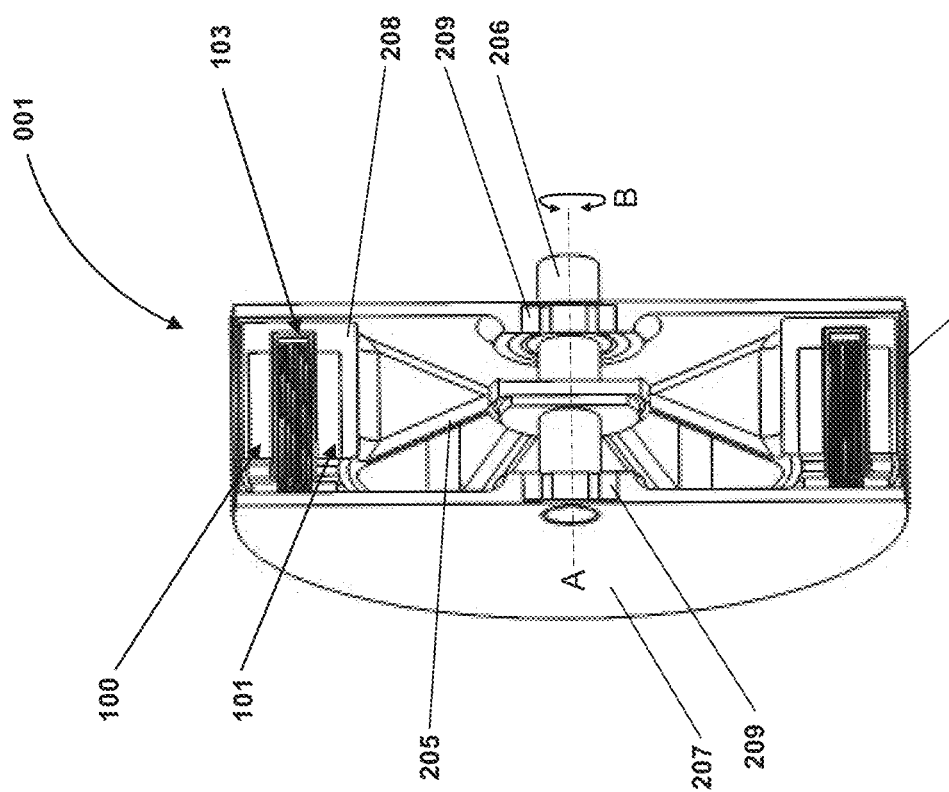
FIG. 10 is a cross section view of a dual rotor machine according to an embodiment of the present invention.
Figure 11:
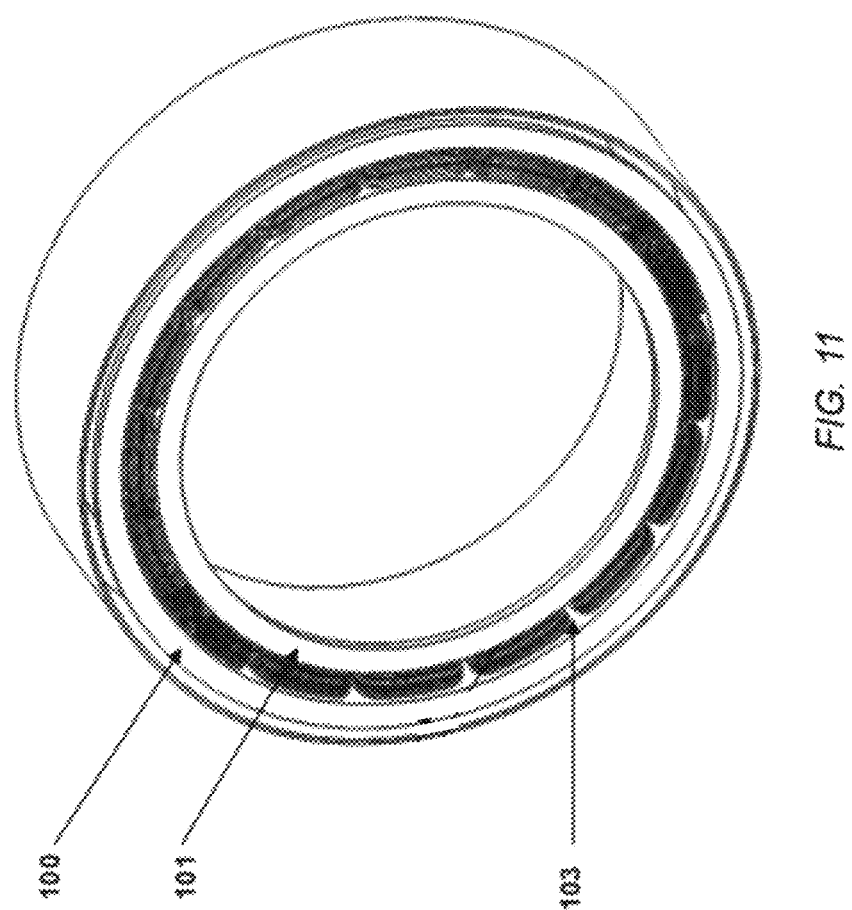
FIG. 11 is a perspective view of a dual rotor machine according to an embodiment of the present invention.

Referring now specifically to FIG. 10, a cross section view of a dual-rotor machine 001 of the invention is depicted. In this embodiment, the inner and outer rotor support structure 208 rotates about the axis of rotation A, which runs along the longitudinal axis of the inner support cylinder. The support cylinder 208 rotates within the frame 207, which is stationary. The support cylinder 208 is rotatably connected to the frame. The outer support cylinder is seated on a plurality of bearings that follow a track in the interior side of the frame. The stator may be fixed to the frame at one end and fitted with bearings on the opposite end. The stator 103 is stationary with respect to the frame and does not rotate about the axis of rotation, which is the common axis of coaxially-disposed inner rotor 101, outer rotor 100, and stator 103, the axis of each forming a common axis. The bearings follow a track in the interior side of the iron shell. The outer rotor, which comprises a Halbach array, is mechanically connected to the outer support cylinder and rotates with the cylinder about the axis of rotation. Similarly, the inner rotor, which comprises a Halbach array, is mechanically connected to the inner support cylinder and rotates with the cylinder about the axis of rotation.

The rotors 100 and 101 of the invention may comprise Halbach arrays that are themselves comprised of permanent magnets produced by a method of manufacturing permanent magnets as described in U.S. provisional patent application 62/315,622 to which this application claims benefit of priority and which has previously been incorporated herein by reference in its entirety. Such a "powder-in-tube" method may be used to create Halbach arrays 100 and 100 for use with embodiments of the present invention. In an embodiment of the method, a fine powder is created from a combination of ferro-magnetic metals. The powder (a metal alloy) is placed in a non-magnetic container of any desired shape which could be, for example, a tube. The metal alloy and tube are swaged while a magnetic field is applied. Once swaging is complete, the metal alloy and tube are sintered and then cooled. Following cooling, the metal alloy is magnetized by placing the metal alloy (and tube) between poles of powerful electromagnets and energizing the electromagnets. Using this process, permanent magnets of any desired shape may be produced.

Figure 12:
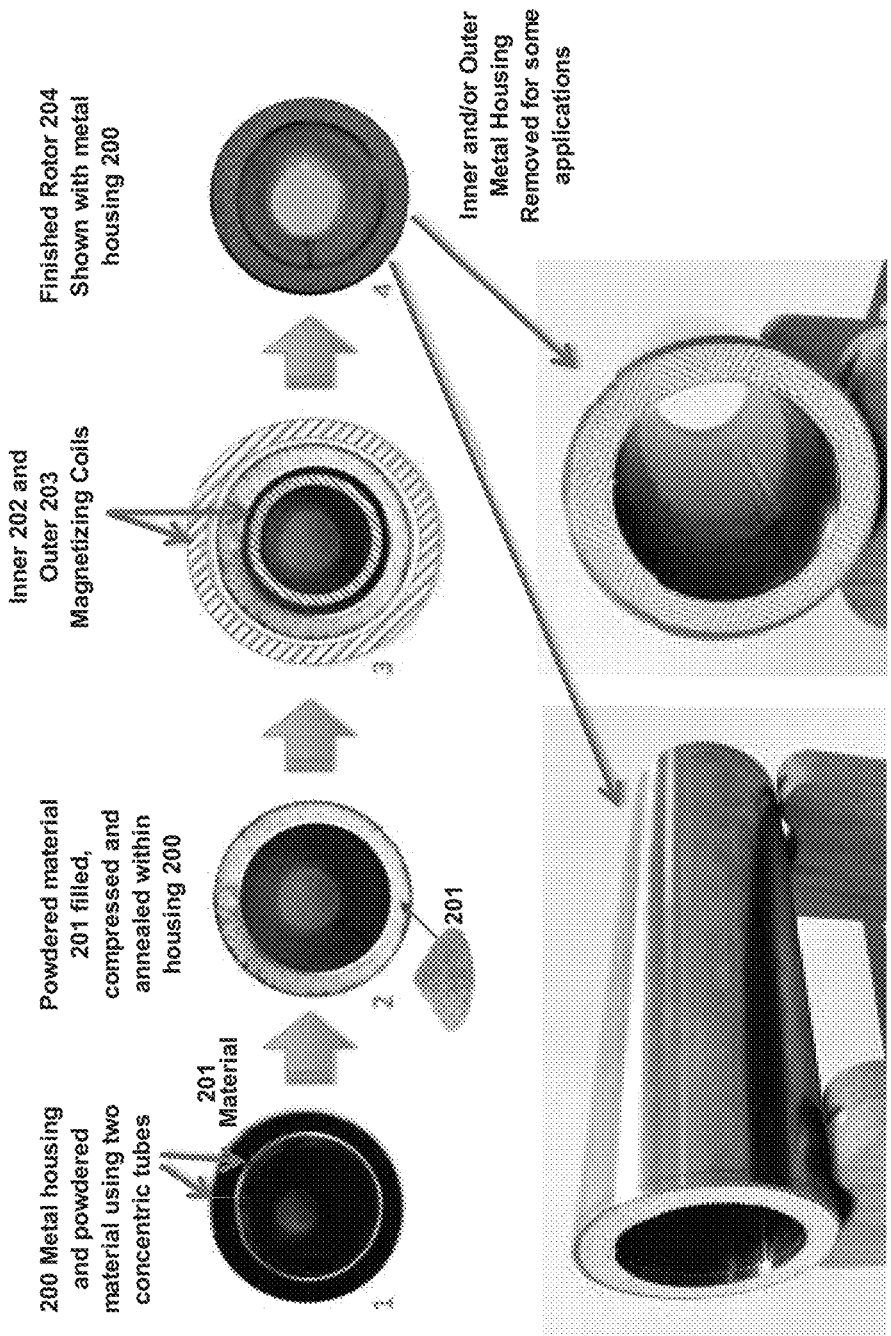
FIG. 12 is a composite view of the steps of making the rotors of the invention using an in situ, or flux directed, process in which the Halbach arrays comprise a continuously variable magnetic field.

Referring now to FIG. 12, in an alternative embodiment, the Halbach arrays comprising rotors 100 and 101 of the invention may be monolithic permanent magnets fabricated from a process in which they are magnetized in situ in a flux directed fashion as described in U.S. provisional patent application 62/478,941, titled "Single-step Manufacturing of Flux-Directed Permanent Magnet Assemblies", filed in the United States Patent and Trademark Office on Mar. 30, 2017, which is hereby incorporated by reference in its entirety. In a first step 1, two concentric tubes or other structures are used to create a volume or housing 200 for capturing powdered metal material 201, which may be a metal alloy; in step 2 the powdered metal material 201 is filled into the volume or housing 200; in step 3 a strong magnetic field is applied to achieve desired magnetic field strength and flux direction properties (for example, as for forming a Halbach array for comprising inner rotor 101 and outer rotor 100), resulting in a completed flux-directed magnetic assembly 204 (step 4). The magnetization of step 3 may be achieved by placing the annealed metal alloy material 201 in between two magnetizing coils 202 and 203. These coils may be pulsed to produce very high magnetic fields, up to 7 Tesla, for magnetizing the annealed metal alloy 201. Magnetic coils 202 and 203 may be any magnetizing coil, such as a double-helix winding configuration, such as, for example, Direct-Double Helix™ wiring, which is the subject of U.S. Pat. No. 7,889,042, which issued from the USPTO on Feb. 15, 2011, entitled HELICAL COIL DESIGN AND PROCESS FOR DIRECT FABRICATION FROM A CONDUCTIVE LAYER, which is incorporated herein by reference in its entirety, or the helical-like wiring assemblies illustrated in U.S. Pat. No. 7,990,247, entitled COIL MAGNETS WITH CONSTANT OR VARIABLE PHASE SHIFTS, which issued from the USPTO on Aug. 2, 2011, and U.S. Pat. No. 8,424,193, entitled A METHOD OF PROVIDING AND OPERATING A CONDUCTOR ASSEMBLY, both of which are also incorporated herein by reference in their entirety.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

We claim:

1. A dual-rotor machine, comprising:
   a frame;
   a cylindrically shaped inner rotor having an outside diameter and a longitudinal axis, said inner rotor comprising a first Halbach permanent magnet array;
   a cylindrically shaped outer rotor having an inside diameter and a longitudinal axis, said outer rotor comprising a second Halbach permanent magnet array;
   and a cylindrically shaped stator having an inside diameter, an outside diameter, and a longitudinal axis, said stator comprising a magnetic coil;
   wherein said stator is affixed to said frame; and
   wherein said inner rotor, said outer rotor, and said stator are coaxially disposed forming a common axis for all of them, said inner rotor and said outer rotor being attached to one another, or attached to a common structure, and are rotably attached to said frame either directly or through a structure;
   wherein said inner rotor outer diameter is less than said stator inside diameter, forming an air gap between them, and said outer rotor inside diameter is greater than said stator outside diameter, forming an air gap between them;

wherein said inner rotor and said outer rotor are able to rotate around said stator, about said common axis;

wherein the first and second Halbach arrays comprising the inner rotor and outer rotor, respectively, are further described as comprising permanent magnets fabricated by the steps of containing magnetic metal alloy powder in a non-magnetic tube, followed by swaging the magnetic metal alloy powder and non-magnetic tube.

2. The dual-rotor machine of claim 1 wherein said stator comprises a double-helix winding configuration.

3. The dual-rotor machine of claim 2 wherein said double helix magnet is further defined as a direct-double-helix winding configuration.

4. The dual-rotor machine of claim 1 wherein said first Halbach array and said second Halbach array each produce a magnetic field that together form a resulting magnetic field characterized as having a flux density of up to 2.0 Tesla.

5. The dual-rotor machine of claim 2 wherein said first Halbach array and said second Halbach array each produce a magnetic field that together form a resulting magnetic field characterized as having a field strength of up to 2.0 Tesla.

6. The dual-rotor machine of claim 3 wherein said first Halbach array and said second Halbach array each produce a magnetic field that together form a resulting magnetic field characterized as having a field strength of up to 2.0 Tesla.

7. The dual-rotor machine of claim 1 wherein the stored magnetic energy in the air gaps surrounding the stator for conversion to mechanical or electrical energy is at least 0.5 kJ/m.

8. The dual-rotor machine of claim 2 wherein the stored magnetic energy in the air gaps surrounding the stator for conversion to mechanical or electrical energy is at least 0.5 kJ/m.

9. The dual-rotor machine of claim 3 wherein the stored magnetic energy in the air gaps surrounding the stator for conversion to mechanical or electrical energy is at least 0.5 kJ/m.

* * * * *